United States Patent
Tracy et al.

(10) Patent No.: US 9,024,546 B2
(45) Date of Patent: May 5, 2015

(54) ILLUMINATED LATCH

(75) Inventors: Mark S. Tracy, Tomball, TX (US); Earl W. Moore, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 449 days.

(21) Appl. No.: 13/379,462

(22) PCT Filed: Jul. 28, 2009

(86) PCT No.: PCT/US2009/052013
§ 371 (c)(1),
(2), (4) Date: Dec. 20, 2011

(87) PCT Pub. No.: WO2011/014161
PCT Pub. Date: Feb. 3, 2011

(65) Prior Publication Data
US 2012/0098467 A1    Apr. 26, 2012

(51) Int. Cl.
| F21V 33/00 | (2006.01) |
| E05B 17/10 | (2006.01) |
| F21V 8/00 | (2006.01) |
| G06F 1/16 | (2006.01) |
| E05B 65/00 | (2006.01) |
| F21V 17/18 | (2006.01) |
| F21Y 101/02 | (2006.01) |
| F21Y 105/00 | (2006.01) |

(52) U.S. Cl.
CPC ............. *F21V 33/0052* (2013.01); *E05B 17/10* (2013.01); *E05B 65/006* (2013.01); *F21V 17/18* (2013.01); *F21V 33/00* (2013.01); *F21Y 2101/02* (2013.01); *F21Y 2105/008* (2013.01); *G02B 6/0045* (2013.01); *G06F 1/1679* (2013.01)

(58) Field of Classification Search
USPC ............. 315/76, 84, 119, 120, 123, 362–363; 362/85, 22, 26, 559, 109, 133, 155
See application file for complete search history.

(56) References Cited

U.S. PATENT DOCUMENTS

| 6,561,668 | B2 | 5/2003 | Katayama et al. |
| 6,700,316 | B2 * | 3/2004 | Taniuchi et al. ............... 313/111 |
| 6,776,497 | B1 | 8/2004 | Huppi et al. |
| 6,902,286 | B2 | 6/2005 | Hunter |
| 7,384,155 | B2 * | 6/2008 | Seki ................................ 353/60 |
| 7,436,657 | B2 | 10/2008 | Motai et al. |
| 8,035,481 | B2 * | 10/2011 | Krah ............................ 340/7.58 |
| 2002/0075670 | A1 | 6/2002 | Naghi et al. |
| 2002/0085371 | A1 * | 7/2002 | Katayama et al. ............... 362/85 |
| 2007/0253182 | A1 * | 11/2007 | Motai et al. ..................... 362/23 |

OTHER PUBLICATIONS

International Searching Authority, International Search Report and Written Opinion, Appln No. PCT/US2009/052013, date of mailing Apr. 19, 2010, 12 p.

* cited by examiner

*Primary Examiner* — James H Cho
(74) *Attorney, Agent, or Firm* — Hewlett-Packard Patent Department

(57) ABSTRACT

An illuminated latch apparatus is provided. The illuminated latch apparatus can include a latch member 100 with at least one surface 110 having a channel 120 formed therein. A light guide 200 having a first end 210 and a second end 220 can be at least partially disposed within the channel 120. A light source 310 can be disposed proximate the first end 210 of the light guide 200.

12 Claims, 3 Drawing Sheets

ILLUMINATED LATCH

BACKGROUND ON THE INVENTION

Description of the Related Art

Electronic devices such as computing devices, gaming devices, communications devices, and the like are subjected to continuous miniaturization. With miniaturization comes an increased ability to personally transport these electric devices throughout the day. The reduction in chassis size frequently limits the amount and configuration of electronic equipment carried on-board the chassis of the electronic device. With portability comes the need to effectively and efficiently use the electronic device at all times and in varied environments, including both high and low ambient light conditions. Thus, it is often desirable to illuminate at least a portion of the electronic device to facilitate operation in low ambient light conditions.

SUMMARY OF THE INVENTION

An illuminated latch apparatus is provided. The illuminated latch apparatus can include a latch member with at least ore surface having a channel formed therein. A light guide having a first end and a second end can be at least partially disposed within the channel. A light source can be disposed proximate the first end of the light guide.

An illumination system is also provided. A clamshell electronic device can include a first member and a second member connected using at least one hinge. A latching system can be disposed about the clamshell electronic device, the latching system can include an illuminated latch disposed on the first member and a complimentary second latch disposed on the second member. The illuminated latch can include a latch member with at least one surface having a channel formed therein. A light guide having a first end and a second end can be at least partially disposed within the channel. A light source can be disposed within the first member, proximate the first end of the light guide. The illuminated latch can detachably attach to the second latch when the clamshell electronic device is closed. At least a portion of the second member can be illuminated with visible light, at least a portion of which is transmitted through the light guide from the light source, when the illuminated latch is detached from the second latch.

A method for illuminating a clamshell electronic device is also provided. An illuminated latch can be at least partially within a first member of a clamshell electronic device including the first member pivotably connected to a second member using at least one hinge. The illuminated latch can include a channel at least partially disposed within the latch member and a light guide having a first end and a second end disposed at least partially within the channel. Visible light can be generated by a light source when the clamshell electronic device is opened. At least a portion of the visible light from the first end of the light guide to the second end of the light guide. At least a portion of the second member can be illuminated using all or a portion of the visible light emanating from the second end of the light guide.

As used herein, the term "light" can refer to any electromagnetic energy or radiation falling within the visible spectrum, i.e., comprising electromagnetic energy having one or more wavelengths falling within the range of about 300 nm to about 800 nm. Such light can be monochromatic (i.e. comprised of only one wavelength) or polychromatic (i.e. comprised of a mixture of two or more wavelengths).

As used herein, the term "clamshell" refers to an enclosure having two members pivotably connected using at least one hinge disposed along at least one edge of each member. A laptop computer, the Nintendo® DS handheld gaming system, and a Motorola Razr® cellular telephone provide illustrative, though not exhaustive, examples of the nature and character of a clamshell electronic device. Generally, clamshell electronic devices are considered to be in the "closed" position when the two members forming the device are proximate each other, and in the "open" position when the two members forming the device are in any other position relative to each other.

BRIEF DESCRIPTION OF THE DRAWINGS

Advantages of one or more disclosed embodiments may become apparent upon reading the following detailed description and upon reference to the drawings in which.

DETAILED DESCRIPTION

Figure 1:
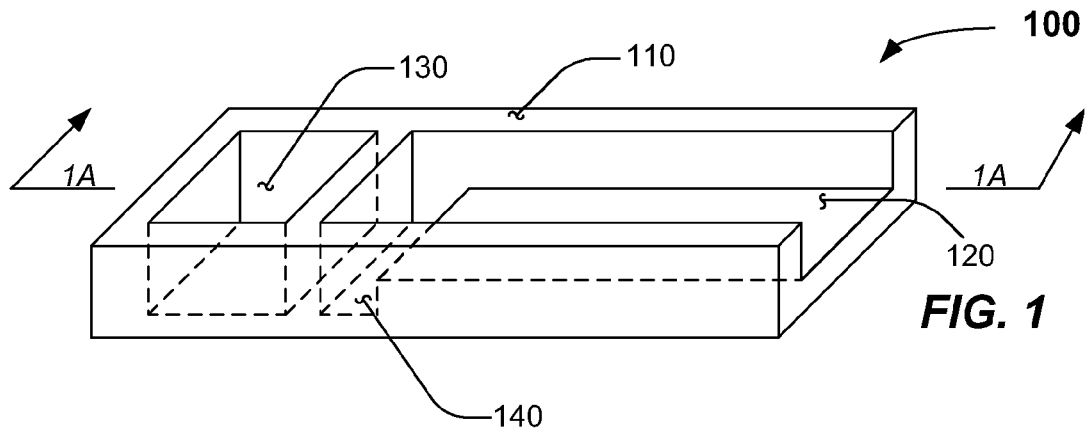
FIG. 1 is a perspective view of an exemplary latch member, according to one or more embodiments described herein.
Figure 1A:
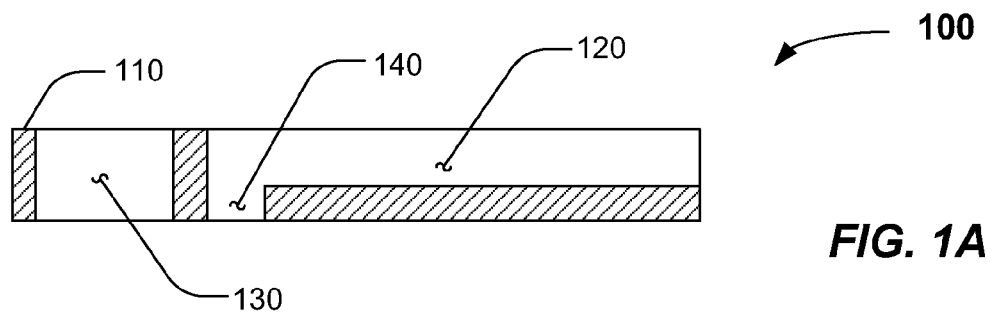
FIG. 1A is a sectional view of the exemplary latch member depicted in FIG. 1, along line 1A-1A, according to one or more embodiments described herein.

FIG. 1 is a perspective view of an exemplary latch member 100, according to one or more embodiments. FIG. 1A is a sectional view of the exemplary latch member 100 depicted in FIG. 1, along line 1A-1A, according to one or more embodiments. The latch member 100 can have any physical shape or configuration adapted to provide a first surface 110 having a channel 120 formed therein. Although a generally rectangular latch member 100 is depicted in FIG. 1 and described in detail herein, other shapes can be similarly employed to achieve comparable results, such alternative shapes should be considered as encompassing one or more alternative embodiments.

In one or more embodiments, the latch member 100 can be a generally rectangular member having at least one aperture disposed therethrough. In one or more specific embodiments, such as that exemplified in FIGS. 1 and 1A, a first aperture 130 and a second aperture 140 can be disposed about the latch member 100. The first aperture 130 can penetrate the latch member, creating an open passage through the member. Such a passage can be adapted to engage a complimentary second latch member, thereby permitting the detachable attachment of the latch member 100 to the complimentary second latch member. The second aperture 140 can be disposed proximate or intersecting all or a portion of the channel 120. When so disposed, the second aperture 140 can provide a passage for the transmission of light reflected from within the channel 120.

The latch member 100 can be a metallic, non-metallic, or composite (partially metallic and partially non-metallic) member having sufficient structural strength to serve as a latching mechanism, for example a latching mechanism disposed in, on, or about a clamshell electronic device. In one or more specific embodiments, the latch member 100 can be a cast or machined metallic member having all or a portion of the channel 120 cast, machined, or otherwise disposed in the first surface 110 of the latch member 100. The channel 120 can be of any dimension or depth based upon the overall dimensions of the latch member 100 and/or light guide disposed therein. In one or more specific embodiments, the depth of the channel 120, i.e. the distance from the surface 110 to the bottom or base of the channel 120, can be a minimum of about 0.5 mm; about 0.75 mm; or about 1 mm, to a maximum of about 7 mm; about 10 mm; or about 15 mm. In one or more specific embodiments, the width of the channel 120 can be a minimum of about 2 mm; about 5 mm; about 10 mm; or about 25 mm, to a maximum of about 10 mm; about 15 mm; about 20 mm; or about 25 mm.

The first aperture 130 can be symmetrically or asymmetrically shaped. In one or more specific embodiments, the first aperture 130 can be adapted to accommodate the complimentary second latch member. In one example, the second latch member can be a complimentary recess disposed opposite the latch member 100, having a displaceable member that can be at least partially disposed within the first aperture 130. Thus, the specific shape and dimensions of the first aperture 130 can, in one or more embodiments, be dependent upon one or more properties of the second latch member, for example the shape and/or configuration of the second latch member. The first aperture 130 can be square, rectangular, circular, or elliptical in shape. In one or more embodiments, the first aperture 130 can be disposed remote from the channel 120 as depicted in FIGS. 1 and 1A.

The second aperture 140 can be symmetrically or asymmetrically shaped. In one or more embodiments, the second aperture can be at least partially disposed proximate at least a portion of the channel 120. In one or more embodiments, the all or a portion of the second aperture 140 can intersect all or a portion of the channel 120. Although not depicted in FIG. 1 or 1A, in one or more embodiments, the first aperture 130 can partially intersect the second aperture 140.

Figure 2:
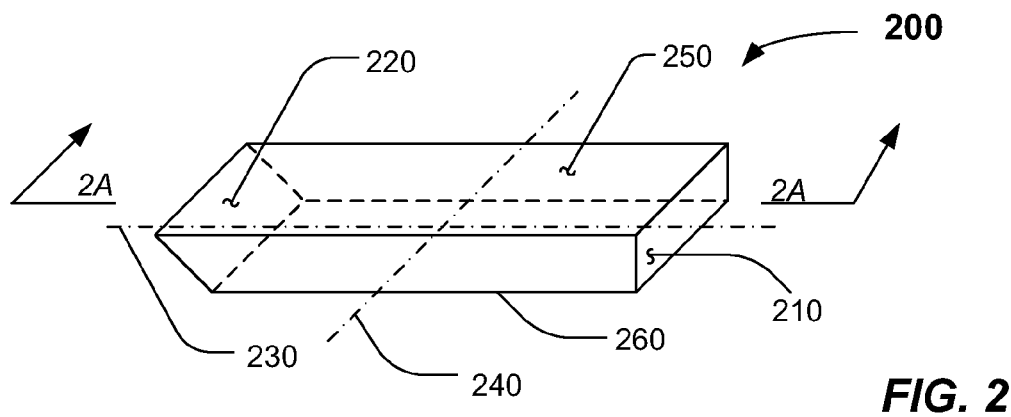
FIG. 2 is a perspective view of an exemplary light guide, according to one or more embodiments described herein.
Figure 2A:
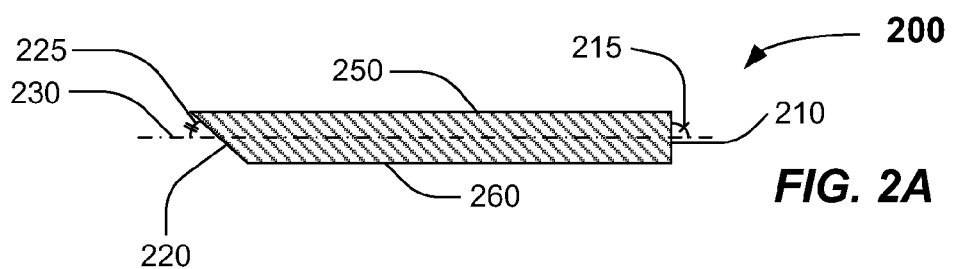
FIG. 2A is a sectional view of the light guide depicted in FIG. 2, along line 2A-2A, according to one or more embodiments described herein.

FIG. 2 is a perspective view of an exemplary light guide 200, according to one or more embodiments. FIG. 2A is a sectional view of the light guide 200 depicted in FIG. 2, along cut line 2A-2A, according to one or more embodiments. The light guide 200 can be a solid member having a first end 210 and a second end 220. The solid member forming all or a portion of the light guide 200 can have an exemplary longitudinal axis 230, and a lateral axis 240. In one or more embodiments, the light guide 200 can be a planar, solid, member having a first ("upper") surface 250, and a second ("lower") surface 260.

As used herein the terms "upper" and "lower" and other like terms refer to relative positions to another and are not intended, nor should be interpreted, to denote any particular absolute direction or spatial orientation. For example, a feature described as being on the "bottom" surface of a device could be on the "top" surface or a "side" surface of the device if the device is rotated or inverted; such rotation or inversion is envisioned to be within the scope of one or more claimed embodiments described herein.

The light guide 200 can have any size, shape, and/or geometry. In one or more embodiments, the light guide 200 can have a particular size, shape, and/or geometry suitable for the partial or complete disposal of the light guide 200 in the channel 120. For example, where the channel 120 generally defines a rectangular shape having a length $L_1$, width $W_1$, and height $H_1$, the light guide can have a similar length $L_2$, width $W_2$, and/or height $H_2$ dimensions such that the light guide 200 can be partially or completely disposed within the channel 120, i.e. the $L_2$, $W_2$, and/or $H_2$ dimensions can be less than or equal to the $L_1$, $W_1$, and $H_1$ dimensions.

In one or more embodiments, the light guide 200 can be a lightpipe. A lightpipe is a type of light guide that can transfer at least a portion of the light incident upon the first end 210 to the second end 220. Within the lightpipe, light can travel via partial or complete internal reflection along the inner surface of a solid member forming the lightpipe where the lightpipe is fabricated using an optical-quality, highly-transmissive, material, for example a clear polycarbonate material.

The light guide 200 can be a waveguide formed using a highly-transmissive material capable of transmitting all or a portion of the light incident on the first end 210 of the light guide along the longitudinal axis 230 of the light guide 200. In one or more embodiments, one or more reflective materials can be disposed in, on, or about all or a portion of the first surface 250 and/or second surface 260 of the light guide 200. In one or more embodiments, one or more reflective materials can be partially or completely disposed in, on, or about all or a portion of the one or more exterior surfaces forming the light guide except the first end 210 where light can enter the light guide 200 and the second end 220 where light can exit the light guide 200.

In one or more embodiments, the first end 210 can form a planar surface disposed at a fixed or constant angle 215 measured with respect to the longitudinal axis 230 of the light guide 200. In one or more embodiments, the first end 210 can be a planar surface forming an angle of from about 30° to about 90° measured with respect to the longitudinal axis 230 of the light guide 200. In one or more specific embodiments, the first end 210 can be disposed at an angle 215 of about 90° measured with respect to the longitudinal axis 230 of the light guide 200.

All or a portion of the light entering the first end 210 of the light guide 200 can be transmitted or otherwise propagated through the guide. Such propagation can occur, in part, due to the highly-transmissive properties of the material forming all or a portion of the light guide 200. For example, light incident upon the first end 210 of the light guide can enter the guide 200. Once within the guide, all or a portion of the light can be partially or completely internally reflected off all or a portion of the external surfaces of the light guide 200. For example, where the upper and lower surfaces (respectively) of the light guide 200 are formed using the first 250 and second 260 surfaces as depicted in FIGS. 2 and 2A, all or a portion of the light propagating through the guide can be partially or completely reflected from the first 250 and second 260 surfaces. All or a portion of the light transmitted or otherwise propagated through the light guide 200 can exit, emanate, or be otherwise emitted from the second end 220 of the light guide 200.

In one or more embodiments, the size, shape, angle, and surface features forming the second end 220 of the light guide 200 can be used to focus, disperse, or otherwise affect one or more properties of the transmitted light exiting the light guide 200. For example, a concave second end 220 can be used to focus all or a portion of the light transmitted by or propagated through the light guide 200; similarly, a convex second end 220 can be used to disperse all or a portion of the light transmitted by propagated through the light guide 200. In one or more embodiments, one or more filters can be disposed on or about the second end 220 of the wave guide 200 to remove, shift, or alter all or a portion of the spectrum of the light emitted from the second end 220 of the light guide 200.

In one or more embodiments, the second end 220 can form a plane disposed at a fixed or constant angle 225 measured with respect to the longitudinal axis 230. In one or more embodiments, the second end 220 can form an angle 225 of about 0° to about 90°; about 10° to about 75°; or about 25° to about 60° measured with respect to the longitudinal axis 230 of the light guide 200. In one or more embodiments, the angle 225 can vary based upon the distance and/or location from the longitudinal centerline 230, for example the second end 220 can form a concave or convex surface.

Figure 3:
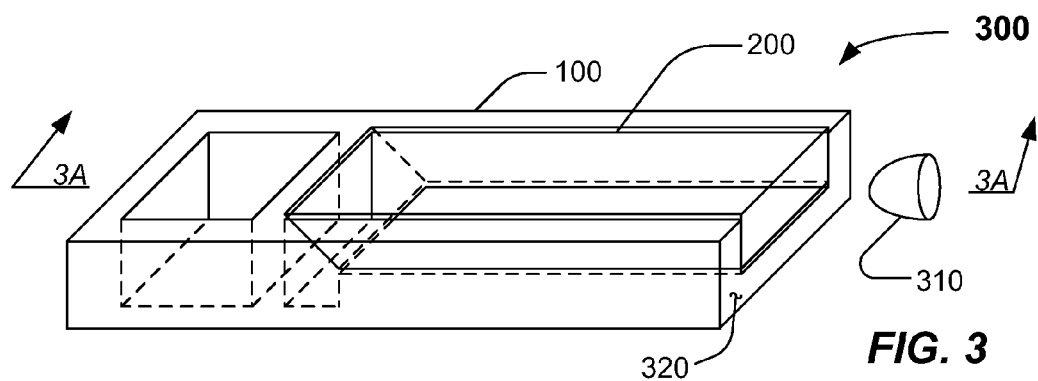
FIG. 3 is a perspective view of an exemplary illuminated latch system, according to one or more embodiments described herein.
Figure 3A:
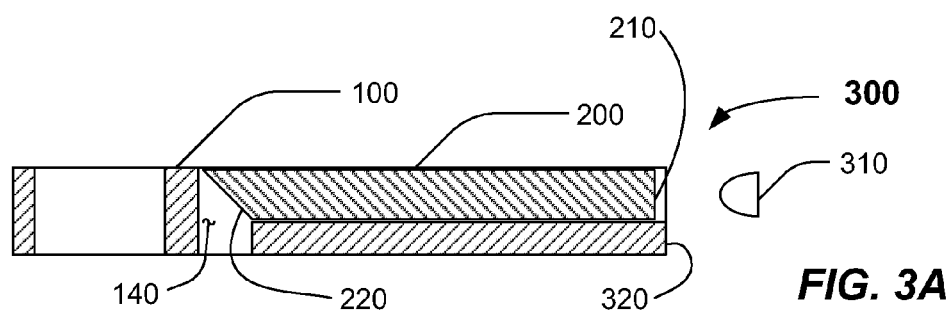
FIG. 3A is a sectional view of the exemplary illuminated latch system depicted in FIG. 3, along line 3A-3A, according to one or more embodiments described herein.

FIG. 3 is a perspective view of an exemplary illuminated latch system 300, according to one or more embodiments. FIG. 3A is a sectional view of the exemplary illuminated latch system 300 depicted in FIG. 3, along line 3A-3A, according to one or more embodiments. In one or more embodiments, the illuminated latch system 300 can include a light guide 200 partially or completely disposed within a channel 120 formed on at least one surface 110 of a latch member 100. In one or more embodiments, the first end 210 of the light guide can be disposed proximate a first end 320 of the latch member 100. In one or more embodiments, the second end 220 of the light guide 200 can be disposed proximate all or a portion of the second aperture 140.

In one or more embodiments, one or more light sources 310 can be disposed proximate the first end 210 of the light guide 200. In one or more embodiments, the one or more light sources 310 can include any source suitable for producing light. Exemplary light sources 310 can include, but are not limited to, one or more Light Emitting Diodes ("LED"); one or more high-output LEDs; one or more organic LEDs ("OLED"); one or more incandescent light sources; one or more fluorescent light sources; one or more halogen light sources; or combinations thereof in any number and/or frequency.

Figure 4:
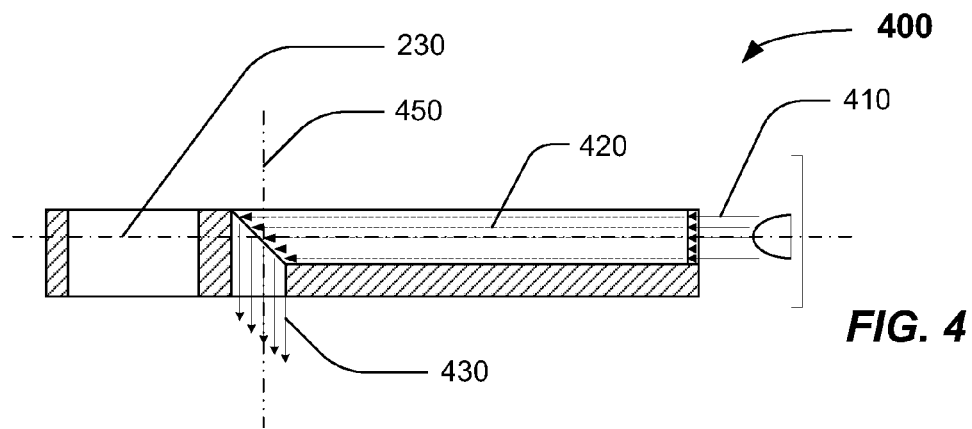
FIG. 4 is a sectional view of an exemplary illuminated latch system, according to one or more embodiments described herein.

FIG. 4 is a sectional view of an exemplary illuminated latch system 400, according to one or more embodiments. In one or more embodiments, the light source 310 can be stimulated, for example through the introduction of an electric current, to produce light 410. In one or more embodiments, all or a portion of the light 410 generated by the at least one light source 310 can be generally parallel to the longitudinal centerline 230 of the light guide 200. All or a portion of the light 410 incident upon the first end 210 of the light guide 200 can be transmitted 420 through or within the light guide 200.

When the transmitted light 420 reaches the second end 220 of the light guide 200, all or a portion of the light 420 can be emitted 430 from the second end 220 of the light guide 200. All or a portion of the emitted light 430 can be transmitted along a skew plane 450 to the longitudinal axis 230 of the light guide 200 (i.e. a plane 450 that is not parallel to the longitudinal axis 230 of the light guide 200). In one or more embodiments, all or a portion of the emitted light 430 can be transmitted along a plane 450 passing through all or a portion of the second aperture 140.

Figure 5:
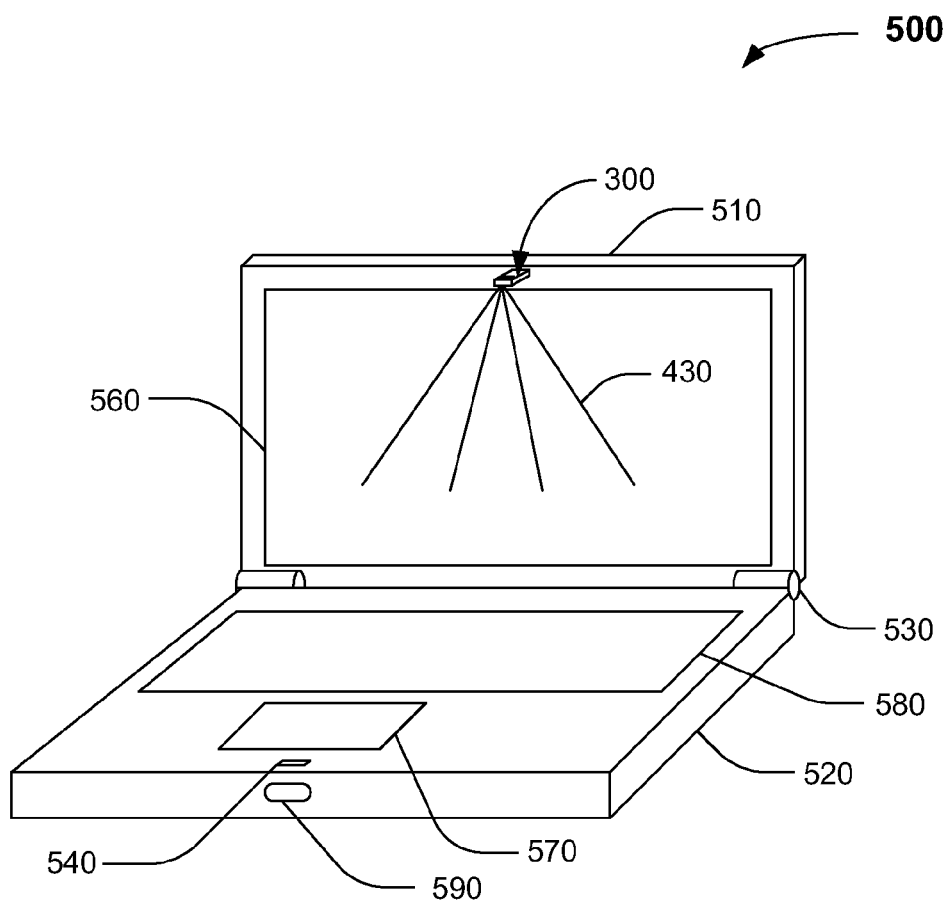
FIG. 5 is a perspective view of an exemplary illuminated latch system at least partially disposed in a clamshell electronic device, according to one or more embodiments described herein.

FIG. 5 is a perspective view of an exemplary illuminated latch system 300 at least partially disposed in a clamshell electronic device 500, according to one or more embodiments. In one or more embodiments, the clamshell electronic device 500 can include a first member 510 pivotably connected to a second member 520.

A latching system can be partially or completely disposed about either or both members 510 and 520. In one or more specific embodiments, the latching system can include the illuminated latch system 300 disposed on the first member 510 the complimentary second latch 540 disposed on the second member 520. In one or more embodiments, the illuminated latch system 300 can be disposed partially or completely within the complimentary second latch 540 when the clamshell electronic device 500 is disposed in a first "closed" position. In one or more embodiments, all or a portion of the illuminated latch system 300 can be partially or completely exposed when the clamshell electronic device 500 is disposed in a second "open" position, such as the second position depicted in FIG. 5.

In one or more embodiments the clamshell electronic device 500 can be a portable computing device, for example a laptop computer, a netbook computer, an ultraportable computer, or the like. In one or more embodiments, the illuminated latch system 300 can be disposed in, on, or about the first member 510 forming the clamshell electronic device and the complimentary second latch 540 can be disposed in, on, or about the second member 520. In one or more embodiments, one or more output devices 560, for example one or more liquid crystal display (LCD) or gas plasma display devices can be partially or completely disposed in, on, or about the first member 510. In one or more embodiments, one or more input devices, for example one or more touchpads 570, keyboards 580, or pointing sticks can be partially or completely disposed in, on, or about the second member 520 (two are depicted in FIG. 5, 570 and 580).

In one or more embodiments, when the clamshell electronic device 500 is disposed in the first, closed, position, all or a portion of the illuminated latch system 300 can be detachably attached to all or a portion of the complimentary second latch 540. The illuminated latch system 300 can be detachably attached to the second latch 540 for example, by the partial or complete passage of a member through the first aperture 130 when the clamshell electronic device 500 is in the closed position. When the clamshell electronic device 500 is in the closed position, the at least one light source 310 can be extinguished.

In one or more embodiments, when the clamshell electronic device 500 is in the second, open, position (such as the position depicted in FIG. 5) the illuminated latch system 300 can be detached from the second latch 540. In one or more embodiments, the detachment of the illuminated latch system 300 from the second latch 540 can cause the flow of an electric current to all or a portion of the at least one light sources 310. In one or more embodiments, although not shown in FIG. 5, a switch can be disposed in, on, or about the clamshell electronic device 500 to permit a user to temporarily or permanently halt the flow of electric current to the at least one light sources 310. Such a switch can be used by a user who does not desire to power the at least one light source 310, for example to save battery life in a portable, battery-operated, clamshell electronic device 500.

In one or more embodiments, the light emitted 440 from the second end of the light guide 200 can be used to illuminate all or a portion of the one or more input devices such as the touchpad 570 and/or keyboard 580. Such illumination can be beneficial when the user of the clamshell electronic device 500 desires to use the device in low ambient light conditions.

In one or more embodiments, a release device 590 can be disposed in, on, or about the clamshell electronic device 500. The release device 590 can provide the user with the ability to detach the illuminated latch system 300 from the complimentary second latch 540 when the clamshell electronic device 500 is disposed in the closed position. In one or more embodiments, the release device 590 can include any device, system, or combination of systems and devices in any number or frequency required to facilitate the detachment of the illuminated latch system 300 from the second latch system 540.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent.

While the foregoing is directed to embodiments of the present invention, other and further embodiments of the invention may be devised without departing from the basic scope thereof, and the scope thereof is determined by the claims that follow.

What is claimed is:

1. An illuminated latch apparatus, comprising:
   a latch member, wherein the latch member comprises at least one surface having a channel formed therein;
   a light guide having a first end and a second end, disposed at least partially within the channel; and
   one or more light sources disposed proximate the first end of the light guide;
   wherein the light guide comprises a highly-transmissive material adapted to transmit light,
   wherein the light guide comprises a member suitable for transmitting at least a portion of the light incident upon the first end of the light guide to the second end of the light guide,
   wherein the light guide comprises a rectangular light pipe,
   wherein the second end of the guide is adapted to emit at least a portion of the transmitted light on a plane skew to a first plane,
   wherein at least a first aperture and a second aperture are disposed about the latch member, and
   wherein at least the second aperture is at least partially intersected by the channel.

2. The apparatus of claim 1, wherein the second end of the light guide comprises a surface adapted to direct at least a portion of the transmitted light through the second aperture.

3. The apparatus of claim 1, wherein the one or more light sources are selected from the group of light sources consisting of: a Light Emitting Diode ("LED"); a high-output LED; an organic LED ("OLED"); an incandescent light source; a fluorescent light source; and a halogen light source.

4. An illumination system, comprising:
   a clamshell electronic device, wherein the clamshell electronic device comprises a first member and a second member pivotably connected using at least one hinge; and
   a latching system disposed about the clamshell electronic device, wherein the latching system comprises an illuminated latch and a complimentary second latch:
      wherein the illuminated latch comprises:
         a latch member comprising at least one surface having a channel formed therein;
         a light guide having a first end and a second end, disposed at least partially within the channel;
         at least one light source disposed within the first member, proximate the first end of the guide;
      wherein the illuminated latch can be detachably attached to the complimentary second latch when the clamshell electronic device is disposed in a first, closed, position; and
      wherein at least a portion of the second member is illuminated with light emitted from the second end of the light guide when the clamshell electronic device is disposed in a second, open, position.

5. The system of claim 4, further comprising:
   a display device at least partially disposed in the first member; and
   a user input device at least partially disposed in the second member.

6. The system of claim 4, further comprising a release device suitable for detaching the illuminated latch from the complimentary second latch.

7. The system of claim 4, further comprising a switch suitable for extinguishing the at least one light source when the illuminated latch is detached from the complimentary second latch.

8. The system of claim 4, wherein the at least one light source is selected from the group of light sources consisting of: a Light Emitting Diode ("LED"); a high-output LED; an organic LED ("OLED"); an incandescent light source; a fluorescent light source; and a halogen light source.

9. The system of claim 4 wherein the light guide comprises a highly-transmissive material adapted to transmit light, and
   wherein the light guide comprises a member suitable for transmitting at least a portion of the light incident upon the first end of the light guide to the second end of the light guide.

10. The system of claim 9,
    wherein the guide comprises a rectangular light pipe; and
    wherein the second end of the guide is chamfered to emit at least a portion of the emitted light on at least one second plane skew to the first plane.

11. A method for illuminating a clamshell electronic device, comprising:
    disposing an illuminated latch at least partially within a first member of the clamshell electronic device;
       wherein the clamshell electronic device comprises the first member pivotably connected to a second member using at least one hinge; and
       wherein the illuminated latch comprises:
          a channel at least partially disposed on a first surface of a latch member; and
          a light guide having a first end and a second end disposed at least partially within the channel;
    generating light using at least one light source when the clamshell electronic device is disposed in a second, open, position;
    passing at least a portion of the light from the first end of the light guide to the second end of the light guide; and
    illuminating at least a portion of the second member using at least a portion of the visible light emitted from the second end of the light guide.

12. The method of claim 11, further comprising:
    disposing a complimentary second latch member at least partially within the second member;
       wherein the illuminated latch can be detachably attached to the complimentary second latch member when the clamshell electronic device is disposed in a first, closed, position; and extinguishing the light source when the clamshell device is disposed in the first, closed, position.

* * * * *